United States Patent [19]
Yoshii et al.

[11] Patent Number: 5,925,583
[45] Date of Patent: Jul. 20, 1999

[54] HEAT-RESISTANT GLASS COMPOSITION

[75] Inventors: Tetsuro Yoshii; Akihiro Koyama; Hiroyuki Tanaka; Nobuyuki Yamamoto; Shigekazu Yoshii, all of Osaka, Japan

[73] Assignee: Nippon Sheet Glass Co., Ltd., Osaka, Japan

[21] Appl. No.: 08/927,532

[22] Filed: Sep. 11, 1997

[30] Foreign Application Priority Data

Sep. 27, 1996 [JP] Japan ..................................... 8-255794
Apr. 25, 1997 [JP] Japan ..................................... 9-108526

[51] Int. Cl.$^6$ .................................................. C03C 3/087
[52] U.S. Cl. ................................................ 501/70; 501/72
[58] Field of Search ....................... 501/70, 72; 313/480, 313/496, 636

[56] References Cited

U.S. PATENT DOCUMENTS

5,599,754  2/1997  Maeda et al. .............................. 501/70
5,631,195  5/1997  Yanagisawa et al. ...................... 501/72

FOREIGN PATENT DOCUMENTS

0146187    6/1985   European Pat. Off. .
49-48449  12/1974   Japan ........................................ 501/70
3-40933    2/1991   Japan .
612905     6/1978   U.S.S.R. .................................. 501/70
1397312    6/1975   United Kingdom .
WO 96/11887 4/1996  WIPO .

*Primary Examiner*—Melissa Koslow
*Attorney, Agent, or Firm*—Sughrue, Mion, Zinn, Macpeak & Seas, PLLC

[57] ABSTRACT

A heat-resistant glass composition which comprises, in % by weight; 56 to 68% of $SiO_2$, 0.2 to 5% of $Al_2O_3$, 0 to 6.4% of $ZrO_2$, 0 to 0.5% of $Li_2O$, 0.2 to 8% of $Na_2O$, 2.5 to 14% of $K_2O$, 1 to 7% of MgO, 2 to 12% of CaO, 0 to 12% of SrO, 0 to 13% of BaO, 0 to 2% of ZnO, 0 to 1% in total of $SO_3$ and $Sb_2O_3$, and 0 to 3% of $TiO_2$, with the proviso of the total amount of $Na_2O$ and $K_2O$ being 7 to 17%, the total amount of MgO and CaO being 7 to 15%, the total amount of SrO and BaO being 4 to 18%, the total amount of MgO, CaO, SrO, and BaO being 15 to 27%, and the total amount of $SiO_2$, $Al_2O_3$, and $ZrO_2$ being 58% or more, and which has an average thermal expansion coefficient of $75 \times 10^{-7}$ to $100 \times 10^{-7}$/K at 50 to 350° C. and a strain point of 530° C. or more. The heat-resistant glass composition has substantially the same thermal expansion coefficient as that of a soda-lime glass used as a window pane of buildings and a strain point than that of the soda-lime glass.

9 Claims, No Drawings

HEAT-RESISTANT GLASS COMPOSITION

FIELD OF THE INVENTION

The present invention relates to a heat-resistant glass composition having substantially the same thermal expansion coefficient as that of a soda-lime glass used as a window pane of buildings and also having a strain point higher than that of such a glass. More particularly, the present invention relates to a heat-resistant glass composition suitable for use as a substrate of displays, such as liquid crystal display panels, electroluminescence display panels, plasma display panels, and fluorescent display tubes.

BACKGROUND OF THE INVENTION

Various glass compositions are disclosed for the glass composition for a substrate used in displays according to the type of the displays. A plasma display panel (hereinafter referred to as "PDP" for brevity) has been attracting attention as a wide-area display for wall type high-definition direction vision TV sets. Soda-lime glass conventionally used in the field of construction has been used as a glass substrate of PDP. In the production process of PDP, the glass substrate is subjected to heat treatment at 500 to 600° C. in steps of baking of electrodes to the substrate, formation of a dielectric layer, formation of a partition wall, formation of a fluorescent substance, and the like. Thermal shrinkage of the glass substrate generated in these heat treatments results in position shift in matching a pattern or laminating a surface glass sheet and a back glass sheet in the subsequent step. Therefore, in producing a large-sized or high-definition PDP, it is necessary to control the thermal expansion coefficient of the glass substrate and its variation. Further, because the glass substrate is combined with an insulating paste, sealing frits, etc., in the above heat treatments, the glass substrate is also required to match with these materials in coefficient of thermal expansion. Accordingly, it is necessary for the glass substrate to have an average thermal expansion coefficient of about $75 \times 10^{-7}$ to $100 \times 10^{-7}$/K in a temperature range of from 50 to 350° C.

In order to decrease thermal shrinkage of glass in the heat treatments, it is necessary to use glass having a high strain point. A non-alkali glass substrate used in liquid crystal displays has a high strain point but is unsuitable for use in PDP because of its small thermal expansion coefficient. On the other hand, the conventional soda-lime glass, which has been produced by a float method that can produce large-area glass plates inexpensively, satisfies the requirement of thermal expansion coefficient for use in PDP. However, such a glass has a strain point of about 500° C., and considerable shrinkage occurs when it is subjected to the heat treatments at 500 to 600° C. Therefore, the conventional soda-lime glass is not suitable for use in large-sized or high-definition PDP.

Means for solving the above-described problem of thermal shrinkage are disclosed in, for example, JP-A-3-40933, JP-A-7-257937,and JP-A-8-165138 (the term "JP-A" as used herein means an "unexamined published Japanese patent application"). However, since the glass compositions disclosed in the Examples of these Japanese publications contain large amounts of $Al_2O_3$ and/or $ZrO_2$, the glass tends to cause devitrification due to the alumina or zirconia content of liner bricks of a furnace when a glass is produced using a general melting furnace. Thus, there is a problem on the quality of glass.

JP-A-8-133778 and WO 96/11887 disclose glass compositions suitable for use in PDP, in which $Al_2O_3$ and $ZrO_2$ are not essential. However, WO 96/11887 demonstrates in its Examples a glass composition having a large amount of $Al_2O_3$ and/or $ZrO_2$, showing the above-described disadvantage. Further, JP-A-8-133778 demonstrates in its Examples glass compositions having an $Al_2O_3$ content of 5.6% by weight or more, which involve the same problem of devitrification in a furnace as described above or the problem of difficulty in melting due to its melting temperature (a temperature at which the composition has a viscosity of $10^2$ poise) as high as 1,564° C. or higher.

SUMMARY OF THE INVENTION

Accordingly, an object of the present invention is to provide a heat-resistant glass composition having substantially the same thermal expansion coefficient as that of the conventional soda-lime glass and a strain point higher than that of the conventional soda-lime glass.

More particularly, the object of the present invention is to provide a heat-resistant glass composition that can be melted in a melting furnace made of general alumina or zirconia brick and is therefore suitable for continuous production of a glass substrate for displays by a float method.

The present invention provides, in its broadest scope, a heat-resistant glass composition comprising, in % by weight:

56 to 68% $SiO_2$,
0.2 to 5% $Al_2O_3$,
0 to 6.4% $ZrO_2$,
0 to 0.5% $Li_2O$,
0.2 to 8% $Na_2O$,
2.5 to 14% $K_2O$,
1 to 7% $MgO$,
2 to 12% $CaO$,
0 to 12% $SrO$,
0 to 13% $BaO$,
0 to 2% $ZnO$,
0 to 1% $SO_3+Sb_2O_3$, and
0 to 3% $TiO_2$,
with the proviso of
7 to 17% $Na_2O+K_2O$,
7 to 15% $MgO+CaO$,
4 to 18% $SrO+BaO$,
15 to 27% $MgO+CaO+SrO+BaO$, and
58% or more $SiO_2+Al_2O_3+ZrO_2$,
which has an average thermal expansion coefficient of $75 \times 10^{-7}$ to $100 \times 10^{-7}$/K in a temperature range of from 50 to 350° C., and a strain point of 530° C. or more.

In a preferred embodiment of the above glass composition, a working temperature $T_W$ at which the glass composition has a viscosity of $10^4$ poise and a devitrification temperature $T_L$ satisfy the relationship: $T_W-T_L \geq -10°$ C., and a rate of devitrification growth $V_L$ at the working temperature $T_W$ is 10 $\mu$m/min or less.

The above glass composition preferably comprises, in % by weight:

56 to 68% $SiO_2$,
0.2 to 5% $Al_2O_3$,
0 to 3% $ZrO_2$,
0 to 0.5% $Li_2O$,
0.2 to 4% $Na_2O$,
6 to 14% $K_2O$,
1 to 7% $MgO$, 6 to 12% CaO,
0 to 12% SrO,
0 to 13% BaO,
0 to 2% ZnO,
0 to 1% $SO_3+Sb_2O_3$, and
0 to 3% $TiO_2$,
with the proviso of
8 to 14% $Na_2O+K_2O$,
8 to 15% MgO+CaO,
8 to 14% SrO+BaO,
20 to 27% MgO+CaO+SrO+BaO and 58% or more $SiO_2+Al_2O_3+ZrO_2$, which has an average thermal expansion coefficient of $75\times10^{-7}$ to $95\times10^{-7}$/K at 50 to 350° C., a strain point of 540° C. or more, and a temperature at which a viscosity of the glass is $10^2$ poise, of 1,560° C. or less.

In a preferred embodiment of the above glass compositions, the SrO content is 2% by weight or more.

The glass composition of the present invention still more preferably comprises, in % by weight:

56 to 68% $SiO_2$,
0.2 to 4.5% $Al_2O_3$,
0 to 2.5% of $ZrO_2$,
0 to 0.5% $Li_2O$,
0.2 to 3.5% $Na_2O$,
7 to 11% $K_2O$,
2 to 6% MgO,
6 to 10% CaO,
2 to 10% SrO,
2 to 10% BaO,
0 to 2% ZnO,
0 to 1% $SO_3+Sb_2O_3$, and
0 to 3% $TiO_2$,
with the proviso of
8 to 14% $Na_2O+K_2O$,
8 to 15% MgO+CaO,
8 to 14% SrO+BaO, and
20 to 27% MgO+CaO+SrO+BaO,
which has a strain point of 550° C. or more and a temperature at which a viscosity of the glass is $10^2$ poise, of 1,550° C. or less.

In a preferred embodiment of the above glass compositions, the total amount of $SiO_2$, $Al_2O_3$, and $ZrO_2$ is 70.1% by weight or more.

The glass composition of the present invention still more preferably comprises, in % by weight:

58 to 66% $SiO_2$,
0.5 to 4% $Al_2O_3$,
0.2 to 2.5% $ZrO_2$,
0 to 0.1% $Li_2O$,
0.5 to 3% $Na_2O$,
8 to 11% $K_2O$,
2 to 6% MgO,
6 to 10% CaO,
2 to 10% SrO,
2 to 10% BaO,
0 to 1% ZnO,
0 to 1% $SO_3+Sb_2O_3$, and
0 to 3% $TiO_2$,
with the proviso of
9 to 13% $Na_2O+K_2O$,
9 to 13% MgO+CaO,
10 to 14% SrO+BaO, and
21 to 26% MgO+CaO+SrO+BaO,
which has an average thermal expansion coefficient of $80\times10^{-7}$ to $90\times10^{-7}$/K at 50 to 350° C. and a strain point of 560° C. or more.

In a preferred embodiment of the above glass compositions, the $K_2O$ content is 9.1% by weight or more and/or the $ZrO_2$ content is 0.9% by weight or less and/or the MgO content is 4.1% by weight or more.

DETAILED DESCRIPTION OF THE INVENTION

The reasons for limitations of components in the glass composition according to the present invention are explained below. Unless otherwise indicated, all % are by weight.

$SiO_2$ is a network former of glass. If the amount of $SiO_2$ is less than 56%, the glass has a low strain point. Therefore, the amount of $SiO_2$ is 56% or more, and preferably 58% or more. On the other hand, if the amount of $SiO_2$ exceeds 68%, the thermal expansion coefficient of a glass becomes small, so that such a thernmal expansion coefficient does not match with that of glass frits, etc., in producing a glass substrate of displays, and also melting properties are decreased. Therefore, the amount of $SiO_2$ is 68% or less, and preferably 66% or less. Thus, the amount of $SiO_2$ is 56 to 68%, and preferably 58 to 66%.

$Al_2O_3$ is a component effective to increase the strain point. Addition of $Al_2O_3$ even in a small amount is also effective in improvement of devitrification and improvement of water resistance. However, if it is added in an amount of less than 0.2%, the effect obtained thereby is small. Therefore, at least 0.2% of $Al_2O_3$ is necessary to obtain the desired effects. Further, it is preferable to use $Al_2O_3$ in an amount of 0.5% or more for a remarkable improvement in devitrifiaction and water resistance.

In general, part of the liner of a melting furnace uses alumina-based brick. The alumina-based brick is corroded during long-term use for melting of glass, and it follows that the alumina concentration of molten glass close to the brick increases. Since the glass composition of the present invention has high contents of alkali metal oxides and alkaline earth metal oxides, the glass composition tends to accelerate corrosion of the brick. If a glass composition initially contains a large amount of $Al_2O_3$, the $Al_2O_3$ concentration in the area close to the brick increases with the progress of corrosion of the brick. As a result, devitrification of $Al_2O_3$ occurs, thereby deteriorating quality of the glass. Therefore, the amount of $Al_2O_3$ in the glass composition is 5% or less, preferably 4.5% or less, and more preferably 4% or less. Thus, the amount of $Al_2O_3$ is 0.2 to 5%, preferably 0.2 to 4.5%, and more preferably 0.5 to 4%.

$ZrO_2$ is a component effective to raise the strain point, similar to $Al_2O_3$. However, since $ZrO_2$ affects physical properties of glass similar to $Al_2O_3$, the present invention does not use the same as an essential component. Nevertheless, since addition of a small amount of $ZrO_2$ is effective in improving water resistance of glass, $ZrO_2$ is preferably used in an amount of 0.2% or more, and preferably 0.3% or more and further in an amount of 0.9% by weight or less.

The liner of a melting furnace is generally made of alumina-based brick and zirconia-based brick. If glass containing a large amount of $ZrO_2$ is melted for a long time, the $ZrO_2$ concentration in the molten glass close to the $ZrO_2$-based brick increases with the progress of corrosion of the brick, so that devitrification occurs due to $ZrO_2$, deteriorating the quality of glass. Therefore, the proportion of $ZrO_2$ is 6.4% or less, preferably 3% or less, more preferably 2.5% or less, and most preferably 0.9% or less. Thus, the amount of $ZrO_2$ is genrally 0 to 6.4%.

$SiO_2$, $Al_2O_3$ and $ZrO_2$ are components to mainly form the network of glass, and are used in a total amount of 58% or more. To obtain improved resistance to chemicals, their total amount is preferably 70.1% or more. In this case, the amount of BaO having a high specific gravity is preferably 4% or less, and more preferably 1.9% or less, in order to secure satisfactory melting properties.

MgO is effective in not only improving melting properties but raising the strain point. If the MgO content is less than 1%, the effects are insufficient. Therefore, the amount of MgO is preferably 2% or more, and more particularly 4.1% or more. However, if the amount of MgO exceeds 7%, the glass tends to cause devitrification. The amount of MgO is preferably 6% or less. The amount of MgO is generally 1 to 7%.

Similar to MgO, CaO is effective in not only improving melting properties but raising the strain point. If the CaO content is less than 2%, the effects are insufficient. The amount of CaO is preferably 6% or more, and more preferably 7% or more. However, if it exceeds 12%, the devitrification tends to occur. The amount of CaO is preferably 10% or less. The amount of CaO is generally 2 to 12%.

To improve melting properties and raise the strain point, MgO and CaO should be used in a total amount of 7% or more, preferably 8% or more, and more preferably 9% or more. If the total amount exceeds 15%, the glass tends to cause devitrification. The total amount is preferably 13% or less. The total amount of MgO and CaO is generally 7 to 15%.

SrO is not always necessary, but is effective in not only improving melting properties but raising the strain point. Therefore, SrO is preferably used in an amount of 2% or more. However, if the proportion of SrO exceeds 12%, devitrification tends to occur, and also the specific gravity of the glass is increased, resulting in increase of the material cost. The amount of SrO is preferably 10% or less. The amount of SrO is genrally 0 to 12%.

BaO is not always necessary, but is effective in improving melting properties. Therefore, BaO is preferably used in an amount of 2% or more. However, if the amount of BaO exceeds 13%, the specific gravity is increased, resulting in increase of material cost. The amount of BaO is preferably 10% or less. The amount of BaO is generally 0 to 13%.

SrO and BaO are required to improve melting properties which are not sufficiently achieved by only MgO and CaO and also to increase the coefficient of thermal expansion in cooperation with $Na_2O$ and $K_2O$ described hereinafter. A sufficient effect is not obtained if the total amount thereof is less than 4%. The total amount is preferably 8% or more, and more preferably 10% or more. However, if the total amount exceeds 18%, the glass tends to cause devitrification, and the material cost is increaseed. The total amount is preferably 14% or less. The total amount of SrO and BaO is genrally 4 to 18%.

MgO, CaO, SrO, and BaO are effective to improve melting properties. If the total amount thereof is less than 15%, a desired melting temperature cannot be obtained. Their total amount is preferably 20% or more, and more preferably 21% or more. On the other hand, if the total amount of these components exceeds 27%, the devitrification temperature of glass becomes low, making it difficult to form into plates. The total amount is preferably 26% or less. The total amount of MgO, CaO, SrO and BaO is generally 15 to 27%.

ZnO is effective to improve melting properties, but tends to easily volitilize, shortening the life of a melting furnace. Therefore, the Zno content is 2% or less, and preferably 1% or less. The amount of ZnO is generally 0 to 2%.

$Li_2O$ has an effect to lower the melting temperature, but at the same time lowers the strain point. Therefore, the $Li_2O$ content is 0.5% or less, preferably 0.2% or less, and more preferably 0.1% or less. It is most preferable that $Li_2O$ is not substantially contained. The amount of $Li_2O$ is generally 0 to 0.5%.

$Na_2O$ is effective to improve melting properties and increase the thermal expansion coefficient. It is also effective to improve the water resistance of glass in cooperation with $K_2O$. If the $Na_2O$ content is less than 0.2%, its effect is not exhibited. A preferred $Na_2O$ content is 0.5% or more. However, addition of a small amount of $Na_2O$ results in a great drop of the strain point and also accelerates corrosion of furnace brick. Therefore, the $Na_2O$ content is 8% or less, preferably 4% or less, and more preferably 3.5% or less. The amount of $Na_2O$ is generally 0.2 to 8%.

$K_2O$ is a component to increase the thermal expansion coefficient and also increase the strain point. If the $K_2O$ content is less than 2.5%, these effects are not sufficiently exhibited. The $K_2O$ content is preferably 6% or more, more preferably 7% or more, most preferably 8% or more, and further most preferably 9.1% or more. If it exceeds 14%, the glass tends to cause devitrification and water resistance deteriorates. The $K_2O$ content is preferably 11% or less. The amount of $K_2O$ is generally 2.5 to 14%.

$Na_2O$ and $K_2O$ are essential to improve melting properties and particularly increase the thermal expansion coefficient. If the total amount thereof is less than 7%, the thermal expansion coefficient becomes too small. The total amount is preferably 8% or more, more preferably 9% or more, most preferably 10% or more. If the total amount exceeds 17%, the strain point falls, or the devitrification temperature rises. The total amount of $Na_2O$ and $K_2O$ is preferably 14% or less, and more preferably 13% or less. The total amount of $Na_2O$ and $K_2O$ is generally 7 to 17%.

$TiO_2$ is not an essential component, but is effective to improve chemical durability. If the $TiO_2$ content exceeds 3%, glass undesirably colors. The amount of $TiO_2$ is generally 0 to 3%.

Sodium sulfate ($Na_2SO_4$) and antimony trioxide ($Sb_2O_3$) can be used as a clarifier. Those are preferably used in such amounts that the residual content in terms of ($SO_3$+$Sb_2O_3$) in the final product glass is 1% or less.

If desired and necessary, the glass composition of the present invention may further contain coloring materials, such as oxides of V, Cr, Mn, Fe, Co, Ni, Cu, Mo, Ru or Ce, in order to adjust transmittance of glass and increase display contrast as the display of PDP, etc.

In order to match with the thermal expansion coefficient of other materials used in the production of PDP, the glass composition must have an average thermal expansion coefficient of $75\times10^{-7}$ to $100\times10^{-7}$/K, preferably $75\times10^{-7}$ to $95\times10^{-7}$/K, and more preferably $80\times10^{-7}$ to $90\times10^{-7}$/K, at 50 to 350° C.

The glass composition of the present invention should have a strain point of 530° C. or more, preferably 540° C. or more, most preferably 550° C. or more, and further most preferably 560° C. or more, in order to suppress thermal shrinkage to a permissible level or below in various heat treatments in the production of glass substrates.

In glass formation by a float method, a suitable viscosity of a glass composition at the inlet of a float bath is around $10^4$ poise. The glass composition of the present invention preferably has a working temperature $T_W$, at which the composition has a viscosity of $10^4$ poise, of 1,140° C. or less. Further, in order to produce high quality glass products, the glass composition preferably is such that the working temperature $T_W$, and the devitrification temperature $T_L$ satisfy the relationship: $T_W - T_L \geq -10°$ C., and preferably $T_W - T_L \geq 0°$ C., and that the rate of devitrification growth $V_L$ at $T_W$ is 10 μm/min or less, and preferably 5 μm/min or less. Furthermore, in order to obtain high quality glass melt, the melting temperature, at which the composition has a viscosity of $10^2$ poise, is preferably 1,560° C. or less, and more preferably 1,550° C. or less.

The heat-resistant glass composition according to the present invention in its broadest scope has excellent water resistance, high strain point, and small thermal shrinkage. Despite those properties, the glass composition according to the present invention also has the thermal expansion coefficient equal to that of conventional soda-lime glass used as window panes. Therefore, when the glass composition is used as a glass substrate for PDP, a wide-area and high-definition PDP can be produced without any alteration to a member, such as glass frit as is used when soda-lime glass is used as a substrate.

In the preferred embodiment of the above glass composition, the working temperature $T_W$ and the devitrification temperature $T_L$ satisfy the relationship: $T_W - T_L \geq -10°$ C., and the rate of devitrification growth $V_L$ at the working temperature $T_W$ is 10 μm/min or less. Therefore, even when the glass composition is melted in a furnace using alumina-based brick, the glass composition of this embodiment is difficult to cause devitrification in the vicinity of the brick and does not suffer melt defects due to the influence of the brick.

In the other embodiment of the present invention, the glass composition is narrower than the broadest one and has the property that the temperature at which a viscosity of the glass composition is $10^2$ poise is 1,560° C. or less. Therefore, the glass composition of this embodiment can produce high quality glass without imposing an excessive burden on a melting furnace.

Where the SrO content is 2% by weight or more, the glass composition has improved melting properties while suppressing devitrification and also has an increased strain point.

In the embodiment of the present invention in which the glass composition is still narrower than the broadest one, the strain point is further raised, and the melting temperature is further lowered.

Where the total content of $SiO_2$, $Al_2O_3$, and $ZrO_2$ that form the network of glass is 70.1% by weight or more, the glass composition exhibits improved chemical durability against acids (e.g., hydrochloric acid, phosphoric acid and nitric acid) and alkalis, which are used in the production of PDP.

In the embodiment of the present invention in which the glass composition is still further narrower than the broadest one, the strain point is particularly high, and the thermal expansion coefficient ranges from $80 \times 10^{-7}$ to $90 \times 10^{-7}$/K, which is closer to that of soda-lime glass. Therefore, the glass composition of this embodiment more closely matches with low-melting glass frits, etc., that are used in conventional PDP comprising a soda-lime glass substrate.

Where the $K_2O$ content is 9.1% by weight or more, the glass composition has an increased thermal expansion coefficient without decreasing in strain point.

Where the $ZrO_2$ content is 0.9% by weight or less, defects due to unmelted $ZrO_2$ that does not melt in glass melting and floats on the surface of the melt can be diminished. Therefore, the yield of glass production can be improved.

Where the MgO content is 4.1% by weight or more, the melting temperature can be lowered without decreasing the strain point. As a result, high quality heat-resistant glass can be produced without imparting a burden to a melting furnace.

The present invention will now be described in greater detail with reference to following Examples and Comparative Examples, but it should be understood that the present invention is not construed as being limited thereto.

EXAMPLE

Glass batches having the composition shown in Table 1 below were compounded. $SO_3$ in the form of sodium sulfate was used as a clarifier. Each batch prepared was melted in a crucible at 1,500° C. for 4 hours. The molten glass batch was cast and gradually cooled to obtain Samples 1 to 16.

Melting temperature (a temperature at which viscosity is $10^2$ poise), working temperature $T_W$ (a temperature at which viscosity is $10^4$ poise), devitrification temperature ($T_L$), rate of devitrification growth ($V_L$), strain point, and thermal expansion coefficient of the resulting glass samples were measured in accordance with the following methods. The results obtained are shown in Table 2.

1) Melting temperature and working temperature $T_W$

A glass was placed in a 70 cc platinum crucible and melted at 1,550° C. to prepare a sample. This sample was set on a sample draw-type high temperature viscosity measurement device, and a platinum ball was suspended in the molten glass sample. The crucible and the contents were brought down, and the viscosity resistance imposed on the platinum ball was measured as a load to obtain the viscosity at each temperature. The relationship of the viscosity vs. temperature was obtained in a temperature range of 900 to 1,550° C.

2) Devitification temperature $T_L$

A glass was crushed and passed through a sieve having an opening of 2,830 μm and then through a sieve having an opening of 1,000 μm. Twenty-five grams were weighed out of the glass particles remaining on the sieve having the opening of 1,000 μm and spread over in a platinum boat of 12 mm in width, 200 mm in length and 9 mm in depth. The boat with the contents was held in a furnace in which temperature was set so as to have an appropriate temperature gradient in a lengthwise direction, for 2 hours. The boat with the contents was taken out of the furnace and gradually cooled, and the glass in the boat was observed with a microscope of 50 magnifications. The highest temperature at which devitrification occurred was taken as a devitrification temperature.

3) Rate of devitrification growth $V_L$ at working temperature $T_W$

In the glass sample after the measurement of $T_L$, the largest length of crystals formed at the position where a temeprature of the glass sample on the platinum boat in the gradient furnace corresponded to $T_W$ was measured, and this length was divided by the holding time (2 hours) to obtain $V_L$.

4) Strain point

A glass rod having a rectangular solid of 3×3×50 mm was formed. The rod was set on a beam-bending type viscosity measurement device with its both ends fixed. A load was applied to the center of the rod, and the strain point was obtained from the relationship between rate of deflection of the rod and temperature.

5) Thermal expansion coefficient

A columnar rod having a diameter of 5 mm and a length of 15 mm was formed. Elongation in a temperature range of from 25° C. to a yield point of the glass was measured, and a thermal expansion coefficient in a temperature range of from 50° C. to 350° C. was calculated therefrom.

Further, the glass samples were evaluated with respect to water resistance and devitrification near the brick of a melting furnace according to the following test methods.

6) Water resistance

A glass sample was crushed and passed through a sieve having an opening of 590 μm and then through a sieve having an openining of 420 μm. The glass particles remaining on the sieve having an opening of 420 μm were washed with ethanol, and, after drying, the same weight as the specific gravity was weighed out and immersed in 100 ml of pure water at 80° C. for 94 hours. After the immersion, weight loss (%) of the glass was calculated as a measure of water resistance.

7) Devitrification

Glass cullet weighing 50 g and a 10-mm square piece of alumina brick ($Al_2O_3$ content: 95%) were put in a platinum container having a width of 50 mm, a length of 50 mm, and a depth of 10 mm, and the glass cullet and the alumina brick were melted at 1,550° C. for 2 hours. The resulting mixture of the molten glass and brick was maintained at 1,000° C. for 24 hours. After cooling to room temperature, the state of the glass in the vicinities of the brick was observed. A glass that devitrification was not observed was graded "A", a glass that slight devitrification was observed was graded "B", and a glass that obvious devitrification growth was observed was graded "C".

The results of the evaluation are also shown in Table 2 below.

TABLE 1

| | Sample No. | | | | | | | | | | | | | | | |
|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 |
| $SiO_2$ | 62.0 | 61.0 | 65.0 | 64.9 | 62.4 | 60.7 | 60.0 | 57.0 | 58.5 | 58.5 | 58.5 | 62.8 | 62.2 | 64.0 | 64.7 | 62.7 |
| $Al_2O_3$ | 4.8 | 3.0 | 1.2 | 1.3 | 1.2 | 3.8 | 0.3 | 0.6 | 4.3 | 4.3 | 4.3 | 3.0 | 4.0 | 3.0 | 3.0 | 3.2 |
| MgO | 3.5 | 3.5 | 4.6 | 3.7 | 4.6 | 3.0 | 3.5 | 2.0 | 4.7 | 4.7 | 4.7 | 4.0 | 4.0 | 4.0 | 4.7 | 4.3 |
| CaO | 7.0 | 7.0 | 9.0 | 7.5 | 9.0 | 6.0 | 7.4 | 11.0 | 5.8 | 4.8 | 4.8 | 4.0 | 3.8 | 6.8 | 6.9 | 6.7 |
| SrO | 3.0 | 6.0 | 6.0 | 6.0 | 6.0 | 5.0 | 1.8 | 4.5 | 6.7 | 9.7 | 6.7 | 6.0 | 7.8 | 5.0 | 3.7 | 6.0 |
| BaO | 7.0 | 6.0 | 5.0 | 5.0 | 5.0 | 8.0 | 12.0 | 9.4 | 8.7 | 5.7 | 7.7 | 5.0 | 0.0 | 0.0 | 1.3 | s.0 |
| ZnO | 0.5 | 0.0 | 0.0 | 0.0 | 0.0 | 0.0 | 0.0 | 0.0 | 1.0 | 2.0 | 0.0 | 0.0 | 0.0 | 0.0 | 0.0 | 0.0 |
| $Li_2O$ | 0.0 | 0.0 | 0.0 | 0.0 | 0.0 | 0.2 | 0.0 | 0.0 | 0.0 | 0.0 | 0.0 | 0.0 | 0.0 | 0.2 | 0.0 | 0.0 |
| $Na_2O$ | 3.6 | 3.0 | 2.8 | 1.7 | 2.8 | 2.0 | 1.8 | 3.8 | 4.1 | 4.1 | 5.1 | 4.0 | 4.0 | 4.0 | 4.8 | 1.7 |
| $K_2O$ | 7.5 | 9.0 | 6.2 | 9.5 | 6.8 | 8.0 | 12.0 | 9.8 | 3.2 | 3.2 | 3.2 | 8.0 | 10.0 | 8.0 | 7.7 | 9.8 |
| $ZrO_2$ | 0.5 | 1.5 | 0.0 | 0.3 | 2.0 | 2.8 | 0.5 | 1.1 | 2.7 | 2.7 | 4.7 | 3.0 | 4.0 | 5.0 | 3.0 | 0.4 |
| $SnO_2$ | 0.0 | 0.0 | 0.0 | 0.0 | 0.0 | 0.2 | 0.0 | 0.0 | 0.0 | 0.0 | 0.0 | 0.0 | 0.0 | 0.0 | 0.0 | 0.0 |
| $TiO_2$ | 0.3 | 0.0 | 0.0 | 0.0 | 0.0 | 0.6 | 0.5 | 0.5 | 0.0 | 0.0 | 0.0 | 0.0 | 0.0 | 0.0 | 0.0 | 0.0 |
| $Fe_2O_3$ | 0.1 | 0.0 | 0.1 | 0.0 | 0.0 | 0.1 | 0.0 | 0.1 | 0.1 | 0.1 | 0.1 | 0.1 | 0.1 | 0.1 | 0.1 | 0.1 |
| $SO_3$ | 0.2 | 0.0 | 0.1 | 0.1 | 0.2 | 0.1 | 0.2 | 0.2 | 0.2 | 0.2 | 0.2 | 0.1 | 0.1 | 0.1 | 0.1 | 0.1 |
| Total | 100.0 | 100.0 | 100.0 | 100.0 | 100.0 | 100.0 | 100.0 | 100.0 | 100.0 | 100.0 | 100.0 | 100.0 | 100.0 | 100.0 | 100.0 | 100.0 |
| $SiO_2 + Al_2O_3 + ZrO_2$ | 67.3 | 65.5 | 66.2 | 66.5 | 65.6 | 67.3 | 60.8 | 58.7 | 65.5 | 65.5 | 67.5 | 69.0 | 70.2 | 70.2 | 70.7 | 66.3 |
| $Na_2O + K_2O$ | 11.1 | 12.0 | 9.0 | 11.2 | 9.6 | 10.0 | 13.8 | 13.6 | 7.3 | 7.3 | 8.3 | 12.0 | 14.0 | 12.0 | 12.5 | 11.5 |
| MgO + CaO | 10.5 | 10.5 | 13.6 | 11.2 | 13.6 | 9.0 | 10.9 | 13.0 | 10.5 | 9.5 | 9.5 | 8.0 | 7.8 | 10.8 | 11.6 | 11.0 |
| SrO + BaO | 10.0 | 12.0 | 11.0 | 11.0 | 11.0 | 13.0 | 13.8 | 13.9 | 15.4 | 15.4 | 14.4 | 11.0 | 7.8 | 5.0 | 5.0 | 11.0 |
| MgO + CaO + SrO + BaO | 20.5 | 22.5 | 24.6 | 22.2 | 24.6 | 22.0 | 24.7 | 26.9 | 25.9 | 24.9 | 23.9 | 19.0 | 15.6 | 15.8 | 16.6 | 22.2 |

TABLE 2

| | Sample No. | | | | | | | |
|---|---|---|---|---|---|---|---|---|
| | 1 | 2 | 3 | 4 | 5 | 6 | 7 | 8 |
| Melting Temperature (°C.) | 1542 | 1528 | 1520 | 1535 | 1497 | 1525 | 1523 | 1511 |
| $T_W$ (°C.) | 1139 | 1119 | 1125 | 1127 | 1096 | 1120 | 1130 | 1098 |
| $T_L$ (°C.) | 1115 | 1105 | 1100 | 1080 | 1092 | 1090 | 1119 | 1082 |
| $T_W-T_L$ (°C.) | 24 | 14 | 25 | 47 | 4 | 30 | 11 | 16 |
| $V_L$ (μm/min) | 0 | 0 | 0 | 0 | 0 | 0 | 0 | 0 |
| Strain Point (°C.) | 571 | 563 | 575 | 578 | 596 | 558 | 590 | 545 |
| Thermal Expansion Coefficient (× $10^{-7}$/K) | 86 | 89 | 79 | 84 | 81 | 85 | 86 | 92 |
| Water Resistance (%) | 0.3 | 0.3 | 0.4 | 0.5 | 0.5 | 0.3 | 1.1 | 0.8 |
| Devitrification near Brick | B | A | A | A | A | A | A | B |

TABLE 2-continued

| | Sample No. | | | | | | | |
|---|---|---|---|---|---|---|---|---|
| | 9 | 10 | 11 | 12 | 13 | 14 | 15 | 16 |
| Melting Temperature (°C.) | 1502 | 1459 | 1467 | 1544 | 1556 | 1505 | 1524 | 1528 |
| $T_W$ (°C.) | 1112 | 1087 | 1097 | 1122 | 1136 | 1098 | 1113 | 1124 |
| $T_L$ (°C.) | 1109 | 1095 | 1093 | 912 | 1023 | 1101 | 1107 | 1107 |
| $T_W$-$T_L$ (°C.) | 3 | −8 | 4 | 210 | 113 | −3 | 6 | 17 |
| $V_L$ (μm/min) | 0 | 3 | 0 | 0 | 0 | 2 | 0 | 0 |
| Strain Point (°C.) | 585 | 592 | 591 | 565 | 575 | 602 | 577 | 585 |
| Thermal Expansion Coefficient (× $10^{-7}$/K) | 76 | 76 | 78 | 83 | 72 | 82 | 83 | 85 |
| Water Resistance (%) | 0.2 | 0.2 | 0.3 | 0.4 | 0.5 | 0.3 | 0.3 | 0.3 |
| Devitrification near Brick | A | A | A | A | A | A | A | A |

As can be seen from Table 2, the glass compositions of Samples 1 to 16 satisfy the specific relationship between the working temperature $T_W$ and the devitrification temperature $T_L$, i.e., $T_W$-$T_L \geq -10°$ C., have a rate of devitrification growth $V_L$ of 10 μm/min or less at the working temperature $T_W$ and a melting temperature of 1,560° C. or less, and exhibit satisfactory resistance against devitrification in the vicinity of alumina brick. Therefore, it is understood that those glass compositions are suitable to continuous production of glass by a float method. Further, those glass compositions have excellent water resistance and high strain point, so that thermal shrinkage of glass in heat treatments is small. Therefore, an average thermal expansion coefficient at a temperature of 50 to 350° C. is $75 \times 10^{-7}$ to $95 \times 10^{-7}$/K, and this well matches with a thermal expansion coefficient of other materials used in the production of PDP. Thus, these glass compositions proved to be suitable as a substrate glass of displays, such as PDP.

COMPARATIVE EXAMPLE

Comparative glass samples having the composition shown in Table 3 below were prepared in the same manner as in the Example. The properties of the resulting glass samples 17 to 21 were measured and evaluated in the same manner as in the Example. The results obtained are shown in Table 4.

The glass composition of Sample 17 is a soda-lime glass used as window glass in the field of construction, and has a low strain point. The glass composition of Sample 18 has a high strain point but exhibits poor water resistance because of absence of an alumina component, and the devitrification temperature is higher than the working temperature. The glass compositions of Samples 19 to 21 tend to cause devitrification in the area near alumina brick on account of a high alumina content. These glass compositions are expected to suffer melt defects when melted in a float melting furnace made of alumina-containing brick, and it is understood that these glass composition are not suitbale to continuous glass production.

TABLE 3

| | Sample No. | | | | |
|---|---|---|---|---|---|
| | 17 | 18 | 19 | 20 | 21 |
| $SiO_2$ | 72.1 | 60.9 | 58.0 | 56.3 | 59.0 |
| $Al_2O_3$ | 1.5 | 0.0 | 7.0 | 10.0 | 7.0 |
| MgO | 4.1 | 3.6 | 2.1 | 2.0 | 3.5 |
| CaO | 8.2 | 7.5 | 4.8 | 10.0 | 7.0 |
| SrO | 0.0 | 11.5 | 6.7 | 0.0 | 5.4 |

TABLE 3-continued

| | Sample No. | | | | |
|---|---|---|---|---|---|
| | 17 | 18 | 19 | 20 | 21 |
| BaO | 0.0 | 5.5 | 7.7 | 8.0 | 5.5 |
| ZnO | 0.0 | 0.0 | 0.0 | 0.0 | 0.0 |
| $Li_2O$ | 0.0 | 0.0 | 0.0 | 0.0 | 0.0 |
| $Na_2O$ | 13.0 | 0.0 | 4.1 | 3.0 | 3.0 |
| $K_2O$ | 1.0 | 10.9 | 6.5 | 6.7 | 9.0 |
| $ZrO_2$ | 0.0 | 0.0 | 2.7 | 2.0 | 0.5 |
| $SnO_2$ | 0.0 | 0.0 | 0.0 | 0.5 | 0.0 |
| $TiO_2$ | 0.0 | 0.0 | 0.1 | 1.5 | 0.0 |
| $Fe_2O_3$ | 0.1 | 0.0 | 0.2 | 0.0 | 0.0 |
| $SO_3$ | 0.0 | 0.1 | 0.1 | 0.0 | 0.1 |
| Total | 100.0 | 100.0 | 100.0 | 100.0 | 100.0 |
| $SiO_2$ + $Al_2O_3$ + $ZrO_2$ | 73.6 | 60.9 | 67.7 | 68.3 | 66.5 |
| $Na_2O$ + $K_2O$ | 14.0 | 10.9 | 10.6 | 9.7 | 12.0 |
| MgO + CaO | 12.3 | 11.1 | 6.9 | 12.0 | 10.5 |
| SrO + BaO | 0.0 | 17.1 | 14.4 | 8.0 | 10.9 |
| MgO + CaO + SrO + BaO | 12.3 | 28.1 | 21.3 | 20.0 | 21.4 |
| Melting Temperature (°C.) | 1462 | 1502 | 1534 | 1533 | 1539 |
| $T_W$(°C.) | 1039 | 1101 | 1134 | 1152 | 1125 |
| $T_L$(°C.) | 991 | 1149 | 1002 | 1176 | 1135 |
| $T_W$-$T_L$ (°C.) | 48 | −48 | 132 | −24 | −10 |
| $V_L$ (μm/min) | 0 | 12 | 0 | 15 | 8 |
| Strain Point (°C.) | 509 | 654 | 574 | 620 | 575 |
| Thermal Expansion Coefficient (×$10^{-7}$/K) | 86 | 88 | 84 | 81 | 87 |
| Water Resistance (%) | 0.4 | 2.5 | 0.2 | 0.2 | 0.7 |
| Devitrification near Brick | A | A | C | C | C |

While the invention has been described in detail and with reference to specific examples thereof, it will be apparent to one skilled in the art that various changes and modifications can be made therein without departing from the spirit and scope thereof.

What is claimed is:

1. A heat-resistant glass composition which comprises, in % by weight;

56 to 68% $SiO_2$,
0.2 to 4.5% $Al_2O_3$,
0.3 to 6.4% $ZrO_2$,
0 to 0.5% $Li_2O$,
0.2 to 8% $Na_2O$,
9.1 to 14% $K_2O$,
1 to 7% MgO,
2 to 12% CaO,
0 to 12% SrO,
0 to 13% BaO,
0 to 2% ZnO, 0 to 1% $SO_3+Sb_2O_3$, and 0 to 3% $TiO_2$, with the proviso that the following proportions are met:

9.3 to 17% $Na_2O+K_2O$, 7 to 15% MgO+CaO, 4 to 18% SrO+BaO, 15 to 27% MgO+CaO+SrO+BaO, and 58% or more $SiO_2+Al_2O_3+ZrO_2$, and which has an average thermal expansion coefficient of $75\times10^{-7}$ to $100\times10^{-7}$/K at 50 to 350° C. and a strain point of 530° C. or more, wherein a working temperature $T_W$ at which the glass composition has a viscosity of $10^4$ poise and a devitrification temperature $T_L$ satisfy the relationship: $T_W-T_L \geqq -10°$ C., and a rate of devitrification growth $V_L$ at said working temperature $T_W$ is 10 μm/min or less.

2. A heat-resistant glass composition as claimed in claim 1, which comprises, in % by weight;

56 to 68% $SiO_2$, 0.2 to 4.5% $Al_2O_3$, 0.3 to 3% $ZrO_2$, 0 to 0.5% $Li_2O$, 0.2 to 4% $Na_2O$, 9.1 to 14% $K_2O$, 1 to 7% MgO, 6 to 12% CaO, 0 to 12% SrO, 0 to 13% BaO, 0 to 2% ZnO, 0 to 1% $SO_3+Sb_2O_3$, and 0 to 3% $TiO_2$, with the proviso that the following proportions are met:

9.3 to 14% $Na_2O+K_2O$ 8 to 15% MgO+CaO, 8 to 14% SrO+BaO, 20 to 27% MgO+CaO+SrO+BaO, and 58% or more $SiO_2+Al_2O_3+ZrO_2$, and which has an average thermal expansion coefficient of $75\times10^{-7}$ to $95\times10^{-7}$/K at 50 to 350° C. and a strain point of 540° C. or more, and a temperature at which the glass has a viscosity of $10^2$ poise is 1,560° C. less.

3. A heat-resistant glass composition as claimed in claim 2, wherein the SrO content is 2% by weight or more.

4. A heat-resistant glass composition as claimed in claim 2, which comprises, in % by weight;

56 to 68% $SiO_2$, 0.2 to 4.5% $Al_2O_3$, 0.3 to 2.5% $ZrO_2$, 0 to 0.5% $Li_2O$, 0.2 to 3.5% $Na_2O$, 9.1 to 11% $K_2O$, 2 to 6% MgO, 6 to 10% CaO, 2 to 10% SrO, 2 to 10% BaO, 0 to 2% ZnO, 0 to 1% $SO_3+Sb_2O_3$, and 0 to 3% $TiO_2$, with the proviso that the following proportions are met:

9.3 to 14% $Na_2O+K_2O$, 8 to 15% MgO+CaO, 8 to 14% SrO+BaO, and 20 to 27% MgO+CaO+SrO+BaO, and which has a strain point of 550° C. or more, and a temperature at which the glass has a viscosity of $10^2$ poise of 1,550° C. or less.

5. A heat-resistant glass composition as claimed in claim 1, wherein the total amount of $SiO_2$, $Al_2O_3$, and $ZrO_2$ is 70.1% by weight or more.

6. A heat-resistant glass composition as claimed in claim 4, which comprises, in % by weight;

58 to 66% $SiO_2$, 0.5 to 4% $Al_2O_3$, 0.3 to 2.5% $ZrO_2$, 0 to 0.1% $Li_2O$, 0.5 to 3% $Na_2O$, 9.1 to 11% $K_2O$, 2 to 6% MgO, 6 to 10% CaO, 2 to 10% SrO, 2 to 10% BaO, 0 to 1% ZnO, 0 to 1% $SO_3+Sb_2O_3$, and 0 to 3% $TiO_2$, with the proviso that the following proportions are met:

9.6 to 13% $Na_2O+K_2O$, 9 to 13% MgO+CaO, 10 to 14% SrO+BaO, and 21 to 26% MgO+CaO+SrO+BaO, and which has an average thermal expansion coefficient of $80\times10^{-7}$ to $90\times10^{-7}$/K at 50 to 350° C. and a strain point of 560° C. or more.

7. A heat-resistant glass composition as claimed in claim 6, wherein the $K_2O$ content is 9.1% by weight or more.

8. A heat-resistant glass composition as claimed in claim 7, wherein the $ZrO_2$ content is 0.9% by weight or less.

9. A heat-resistant glass composition as claimed in claim 7, wherein the MgO content is 4.1% by weight or more.

* * * * *